May 9, 1933.   L. MIHAY   1,908,162
MANUFACTURE OF COUPLINGS AND THE LIKE
Filed Jan. 12, 1931

Inventor:
Louis Mihay
By Thos. A. Banning
Atty.

Patented May 9, 1933

1,908,162

UNITED STATES PATENT OFFICE

LOUIS MIHAY, OF CHICAGO, ILLINOIS

MANUFACTURE OF COUPLINGS AND THE LIKE

Application filed January 12, 1931. Serial No. 508,095.

The present invention has to do with improvements in the manufacture of couplings such as are used for joining together sections of shafting. These couplings are provided with hubs to which the shafting sections are connected and with outwardly or peripherally extending flanges, so that by joining the two flanges of the coupling together as by the use of bolts or pins, the two sections of shafting are also drivingly joined together.

Heretofore, it has been customary to manufacture these couplings in the form of castings; but couplings made in this manner are subject to the objections and infirmities of cast manufacture, including the fact that the strength of the material is necessarily much less than can be produced in forgings. Heretofore, however, it has been difficult, if not impossible to manufacture the couplings by forging operations, because of the form of the article, the same including the central hub portion, together with the radially extending flange.

Furthermore, in the case of coupings which are made in the form of castings, the maximum strength cannot be secured in the different portions of the coupling due to the fact that the crystals do not follow the proper directions in the different parts of the article to receive and withstand the stresses to the best advantages.

The main object of the present invention is to provide a forged steel or other metal coupling in which the hub and flange portions are forged as a unitary structure from a single billet or block of metal, thereby producing an article having a greatly increased strength and toughness. It is also an object of the invention to provide the means or method whereby this article can be produced.

In connection with the foregoing, it is a further object to provide a forged coupling in which the grain or crystalline structure of the metal in its different portions, all lies in the directions which are most advantageous to receive and withstand the strains to which the article is subjected in service. In this connection, it will be noted that when the coupling is pressed on to the shaft, both the hub and flange portions are subjected to a very large expanding force which tends to split or fracture the coupling substantially in a radial axially extending plane. It is one of the objects of the invention to provide a coupling which is especially well adapted to withstand this strain so that the couplings can be used under conditions in which they are pressed on to the shafts under a very heavy pressure, being formed with a tight fit in order to secure this result. By this means, the coupling will be retained in driving connection with the shaft and be maintained against rotation or slippage with respect to the shaft under onerous conditions of operation, and in some cases even without the use of keys and keyways.

It is, however, a further feature of the invention that during the forging operation, a key-way may be readily formed in the hub without additional operations or movements, during the forging process.

Another object of the invention is to provide a coupling and the method or process of manufacturing the same, whereby the same may be produced to a very close tolerance so that in many cases it will be unnecessary to perform any machining or other finishing operations, except possibly those of drilling or punching holes in the flange for accommodation of the tie bolts or pins.

Other objects and uses of the invention will appear from a detailed description of the same which consists in the features of construction and combination of parts hereinafter described and claimed.

In the drawing:

Figure 4 shows a view similar to that of

Figure 3:
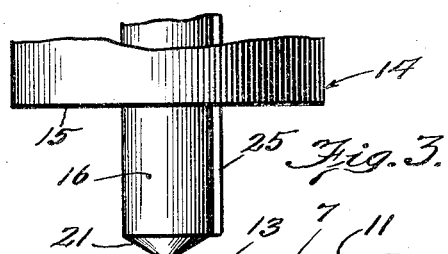
Figure 3 shows a longitudinal section through a mould, together with the die for forming the coupling from the plate by a single operation, the male die being in the raised position as at the commencement of the operation.

Figure 3 with the exception that the forming stroke has been completed and the disk has been pressed out so as to completely occupy the upper portion of the female die and then the plunger has forced and drawn the central portion of the disk downwardly into the female die so as to produce the hub.

Figure 5:
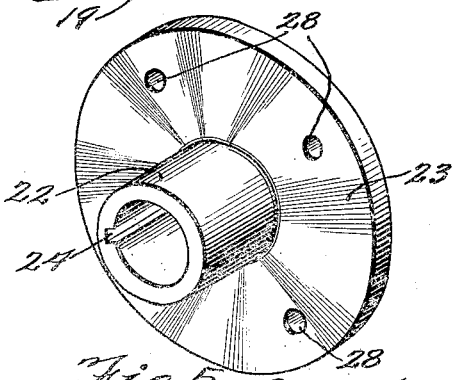

Figure 5 shows a perspective view of a completed coupling member; and

Figure 6:
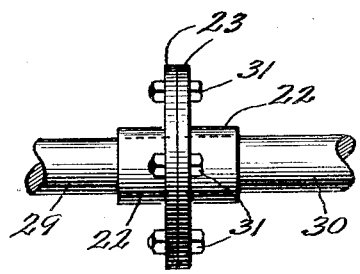

Figure 6 shows a side elevation of a pair of shaft sections joined together by couplings embodying the present invention.

Figure 1:
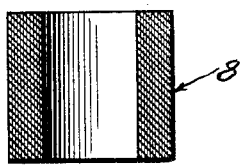
Figure 1 shows a longitudinal section through a block or billet in its initial form.
Figure 2:
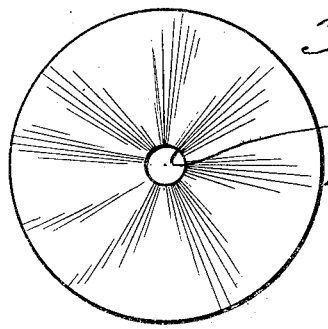
Figure 2 shows a face view of the billet of Figure 1, after the same has been pressed or flattened down into plate form so as to bring the grain or fibre of the metal into radial condition.

In order to produce the coupling of the present invention, use is made of a circular block or plate of the desired steel or other metal, the same also having the proper thickness so that this block retains the proper amount of metal for the coupling. This block is designated in its entirety by the numeral 7. Preferably, the block 7 is pressed out from a section of circular hollow billet 8, such as shown in longitudinal section in Figure 1, this billet 8 being heated to a bright red or white heat and then pressed between a pair of flat dies, whereupon it will assume the form shown in Figure 2 and will also be provided with the central hole 9. By forming the block 7 in the above manner, the grain or fibre thereof will extend in a substantially radial direction all around the block as shown by the light lines, thereby being clearly differentiated from the fiber existing in a block 7 which is stamped or cut out from a large sheet, since in such case the fiber or grain would all extend in a substantially parallel direction.

The mould includes a female die 10, which is formed with a circular shallow recess 11 in its upper portion, together with a central downwardly extending through opening 12 communicated with the opening 11. Preferably there is a rather sharp fillet 13 at the line of joinder between the openings 11 and 12. The opening 11 is of slightly greater diameter than the blank 7, and preferably of substantially the same depth as said blank as is evident from Figure 3.

There is a male die including the plunger 14 which is of the same size as the opening 11 and has a flat bottom surface 15. When said plunger is brought down into the female die, the blank 7 is set down into the form shown in Figure 4 so that it is slightly reduced in thickness but is squeezed outwardly so as to completely occupy the opening 11.

There is a male drawing die pin 16, which is of diameter the same as the intended internal diameter of the hub opening. Said pin 16 may operate either rigidly with the male die 14 or independent thereof. In the former case, the male die head 14 may be set down into the position of Figure 4 without at the same time forcing the pin 16 down, or both the die 14 and the pin 16 may be forced down at the same time.

The opening 12 is the same size as the exterior of the hub of the coupling. There is a removable liner 17 which is set down into the lower end of the opening 12. This liner 17 has an interior longitudinally extending opening 18 of the same size or slightly greater than the pin 16. Preferably both the female die 10 and the liner 17 are carried by a fixed table 18ª having a through opening 19.

The distance between the plane of the bottom face of the opening 11 and the top edge 20 of the liner 17 is equal to the length of the hub of the coupling to be formed. Consequently, during the forming operation, the metal which is drawn down to form the hub will be received and supported by the top edge 20 of the liner 17, so that the hub will be neatly and accurately shaped.

Figure 4:
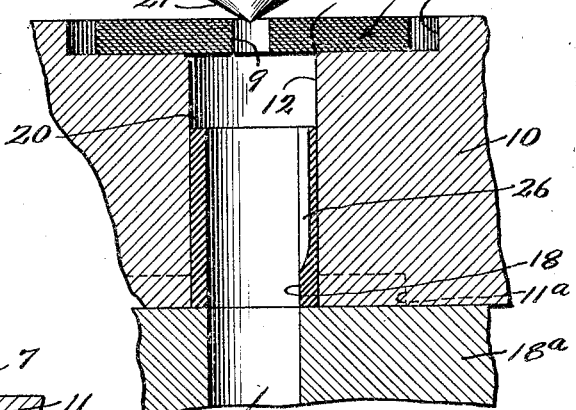
Figure 4:
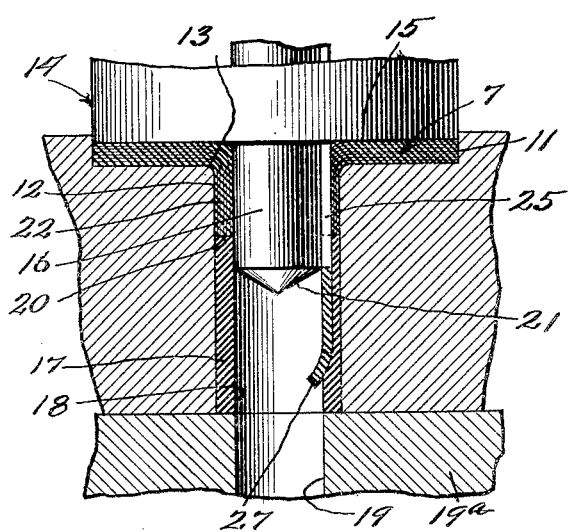

After the blank 7 has been set down into the form of Figure 4 by the press head 14 or else contemporaneously therewith, the pin 16 is forced down into the position of Figure 4. The lower end 21 of this pin 16 is pointed or tapered as shown in Figures 3 and 4 so that it will center itself in the opening 9 of the blank 7. The result is that when the pin 16 is forced down, the metal in the central portion of the blank is drawn down to form the hub 22, said metal being crowded snugly against the surface of the opening 12 and also crowded down against the upper end 20 of the liner 17. The result is that the blank will be drawn into the form of Figure 5 including the flange 23 and the hub 22.

It will be understood that during all of these operations, the blank 7 is heated, being preferably a bright red or white heat so that the metal will draw or flow with reasonable facility in the dies.

In some cases, it may be desirable to form a key way 24 in the hub at the same time that the drawing operations are performed. For this purpose, the pin 16 is shown as provided with a lateral key rib 25 extending lengthwise of said pin 16 and of the proper size to cut out or slot the metal for the key way 24 during the drawing operation; and the liner 17 is also provided with a longitudinally extending groove or slot 26 to receive the rib 25 during the drawing operation, and also to permit the cut away metal to be delivered into the central openings 18 and 19 as shown at 27 in Figure 4.

After the forging operation is completed, the flange 23 may be punched or drilled to provide the bolt openings 28 as shown in Figure 5.

The coupling is used in the usual manner as shown in Figure 6 wherein a pair of the devices are secured to the ends of the shaft sections 29 and 30 and are joined together by the through bolts 31 in the well understood manner.

It will be understood that by the use of this invention, there is provided a coupling member having its grain extending substantially radially in the flange 23 and lengthwise of the hub portion 22 as shown in Figure 5 in particular, so as to establish a device of maximum strength and toughness.

The blank or billet which is to be forged into the coupling is preferably of mild steel, although it may be of either soft or hard steel or metal; and the dies are preferably made of tool steel so as to properly stand up under the service.

In some cases it may be desirable to use the same die block 10 for manufacture of two different sizes of couplings. For this purpose, said die block may be provided with another recess 11ª on its bottom face of different size from the recess 11 so that by turning the die block upside down this other size of recess will be presented, thus making it possible to use the same die for manufacture of two different sizes of couplings.

It will also be understood that the present method and invention may be used for the manufacture of other articles which include the hub portion, together with an outwardly extending portion corresponding to the flange; as for example, for the manufacture of forged gears in which the teeth are formed in the outwardly extending or flange portion which is a unit or integrally formed with the hub.

While I have herein shown and described only a single embodiment of the features of my present invention, still I do not intend to limit myself thereto except as I may do so in the claims.

I claim:

1. The method or process of manufacturing a coupling having a central hub and a radially extending circular flange having the fiber of the metal extending in radial fashion, which consists in preparing a circular hollow billet containing the proper quantity of metal, heating the same to a bright red or white heat, pressing the same between flat dies to form a circular block which is relatively thin as compared to its diameter and wherein the grain or fiber of the metal extending substantially radially throughout its entire body, thereafter drawing the central or hub portion of said block at right angles to the plane of the block to form the hub portion and thereafter pressing the peripheral portion of said block between circular male and female dies, substantially as described.

2. The method or process of manufacturing an integral or unitary forged article of manufacture having a central hub portion together with an outwardly extending flange portion having the fiber of the metal extending in radial fashion, which consists in preparing a circular disc containing the desired quantity of metal and which disc is relatively thin as compared to its diameter, said disc being at a bright red or white heat, placing said disc in a circular female die of proper diameter and depth to receive the disc, there being a central downwardly extending circular opening in said die of the same size as the exterior of the hub portion and having a shoulder or seat at the position of the end of the hub portion, and thereafter drawing the central portion of said disc downwardly into said central opening to form the hub portion of the article by the use of a male plunger die of the same size as the desired central opening in the hub portion of the article, substantially as described.

LOUIS MIHAY.